G. Oerllein.
Harvester Rake.
No. 109,441.      Patented Nov. 22, 1870.
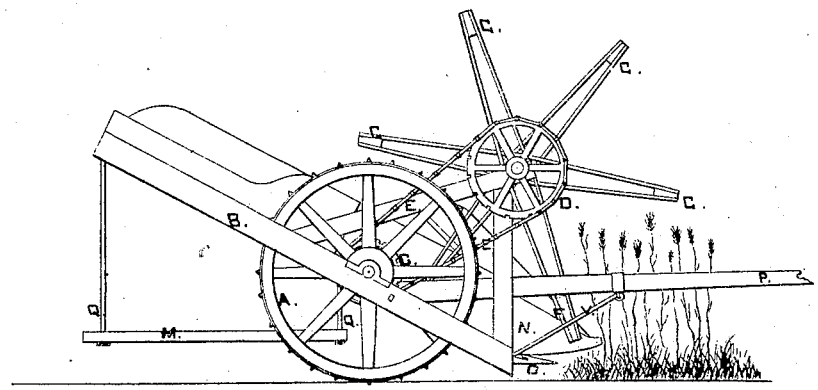
FIG. I.
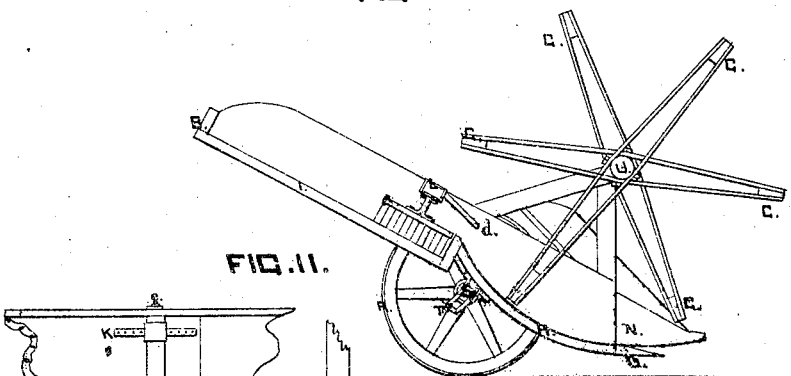
FIG. II.
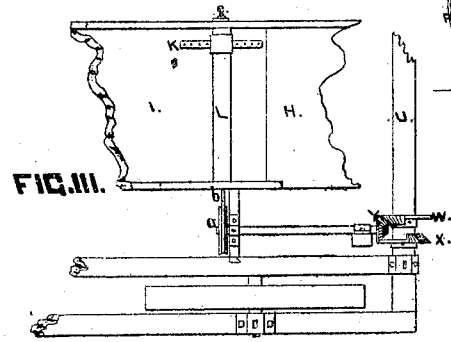
FIG. III.
FIG. IV.
WITNESSES.
S. P. K. Coon
William H. Hornor
INVENTOR.
George Oerllein
By G. B. Smith
his attorney in fact

UNITED STATES PATENT OFFICE.

GEORGE OERLLEIN, OF UTICA, MINNESOTA.

IMPROVEMENT IN HARVESTER-RAKES.

Specification forming part of Letters Patent No. 109,441, dated November 22, 1870.

*To all whom it may concern:*

Be it known that I, GEORGE OERLLEIN, of Utica, in the county of Winona, in the State of Minnesota, have invented certain Improvements in Harvesters, of which the following is a specification:

My invention is for raking grain on a harvester; and consists in an arrangement of machinery hereinafter described and claimed.

Referring to the drawing forming part of this specification, Figure 1 is a side view of my invention; Fig. 2, a sectional view; Fig. 3, a view of raking apparatus; Fig. 4, sectional view of rake and platform.

A is the large wheel of the harvester. B is the frame; C, a sprocket-wheel on the shaft of wheel A; D, a sprocket-wheel on the reel-shaft; E, a chain passing round wheels C and D, which revolves the reel; F, a long arm and rake on the reel which sweeps the grain up, when cut, over the curved platform H, onto the platform I; G, short reel-arms, which bring the grain to the sickles; H, a platform, made curving, so that the long arm F of the reel shall just fit to it as it revolves; I, a platform in rear of the curved platform H for the grain to fall onto as it is carried up by the rake F; K, rake on platform I to rake the grain to the binders; L, bar on which rake K slides. This bar is secured across platform I, and above it, by its end, secured to the side pieces of the frame B. M, a platform on which the men stand to bind the grain; N, divider for the grain; O, the sickle; P, tongue with which the harvester is hauled; Q, rods which hold up platform M; R, small or land wheel; S, bolt through yoke T, with which the frame is adjusted; T, a yoke, with which the frame may be raised or lowered; U, reel-shaft; W, draft-rod wheel on reel-shaft U, with a section of cogs on one side of it to mesh into pinion Y; X, another wheel of the same pattern as W, meshing into pinion Y; Y, pinion on the end of shaft Z, meshing into wheels W and X; $a$, a grooved wheel on the end of shaft Z, and around which is a cord, $b$, fastened to it. One part of this cord $b$ passes under platform I and around the back side of said platform up through blocks $c$ and $e$, and the end of said cord fastened to the rake-head K, and the other part of the cord passes under bar L and over the platform I, and is also fastened to the rake-head K, this cord being fastened to wheel $a$, where it passes round it. As wheel $a$ is revolved in either direction it carries the rake forward and back. $d$, a swing lid or cover attached to bar L by a hinge, to keep the grain from passing over the bar L, and it will turn up as long arm F strikes it as it comes round, and falls back again when the arm passes by.

The operation of this harvester is: As the grain is cut it falls onto the platform H, and long arm or rake F sweeps it up over onto platform I. As soon as the rake F leaves it, the section of cogs on wheel W mesh into pinion Y, and as the reel revolves, shaft Z and wheel $a$ revolve with it, and, drawing on cord $b$, bring the rake-head forward with the grain to the binders, who stand on platform M, and as soon as the cogs in wheel W leave the pinion Y, the cogs in wheel X mesh into pinion Y and carry the rake back again, and so on, alternately, the men on platform M bind the grain and throw it off onto the ground.

I claim as my invention—

Combination of rake F, rake K, shaft U, wheels W and X, pinion Y, shaft Z, wheel $a$, and cord $b$, arranged to operate substantially as described.

GEORGE OERLLEIN.

Witnesses:
J. B. SMITH,
WM. HORNOR.